United States Patent [19]

Tervo

[11] Patent Number: 4,644,811

[45] Date of Patent: Feb. 24, 1987

[54] TERMINATION LOAD CARRYING DEVICE

[75] Inventor: John N. Tervo, Phoenix, Ariz.

[73] Assignee: The United States of America as represented by the Secretary of the Air Force, Washington, D.C.

[21] Appl. No.: 746,617

[22] Filed: Jun. 19, 1985

[51] Int. Cl.[4] .................. F16H 25/20; B66B 11/04
[52] U.S. Cl. ................ 74/412 TA; 74/424.8 R; 187/25
[58] Field of Search .......... 74/459, 412 TA, 424.8 R, 74/89.15, 216.3, 441; 187/24, 25

[56] References Cited

U.S. PATENT DOCUMENTS

| | | | |
|---|---|---|---|
| 2,187,390 | 1/1940 | Anderson et al. | 187/24 |
| 2,447,439 | 8/1948 | Thompson | 74/441 |
| 2,623,403 | 12/1952 | Terpina | 74/441 |
| 2,652,783 | 9/1953 | Skinner | 187/24 |
| 2,739,491 | 3/1956 | Russell | 74/459 |
| 2,966,077 | 12/1960 | Wise | 74/798 |
| 3,215,227 | 11/1965 | MacChesney | 187/24 |
| 3,302,477 | 2/1967 | Grabowski | 74/424.8 |
| 3,304,794 | 2/1967 | Bird | 74/459 |
| 3,687,234 | 8/1972 | Gendreau | 187/25 |
| 4,229,983 | 10/1980 | Morita | 74/89.14 |
| 4,279,329 | 7/1981 | Gehorn | 187/25 |
| 4,287,967 | 9/1981 | Perkins | 187/24 |
| 4,375,770 | 3/1983 | Druet | 74/424.8 A |

FOREIGN PATENT DOCUMENTS

| | | | |
|---|---|---|---|
| 1483626 | 6/1967 | France | 187/25 |
| 1142520 | 2/1969 | United Kingdom | 187/25 |

*Primary Examiner*—Lawrence Staab
*Attorney, Agent, or Firm*—Stanton E. Collier; Donald J. Singer

[57] ABSTRACT

A follower nut assembly is attached to a load carrying nut all of which is threaded onto a ball screw of a drive actuator. The actuator drive causes a load attached to said load carrying nut to be translated to a fully extended position. At about the fully extended position, a run-off end without threads of the ball screw is positioned in the load carrying nut. This causes the translating force to be fully applied to a follower nut which is normally shear pinned to the load carrying nut. Because of the inertia of the load, the follower nut shears the pin and then rotates within a cage of the follower nut assembly. The translation of the load stops when the shear pin is broken. A thrust bearing is positioned between the follower nut and the load carrying nut to provide the necessary support when the load is fully extended.

1 Claim, 2 Drawing Figures

TERMINATION LOAD CARRYING DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to an apparatus for transmitting motion to a load, and, in particular, relates to an apparatus for providing a support to the load after the load has been translated to an extended position.

One prior device for holding the load in the extended position was an external latching means being different from the device for providing the translation to the extended position.

In addition, prior motion-transmitting devices cannot successfully withstand resistance to corotation of the driving and driven elements beyond a certain degree. If the resistance is applied suddenly, as when the output element or member strikes a stop or otherwise freezes, the backlash damages the parts of the device and can even break an input element such as a shaft. Even if the resistance to corotation is gradually increased, a stalling point is eventually reached at which the resistance overcomes the driving force and the driving element is brought to rest. In those application where the driving element is the shaft of or connected to an electric motor, even a gradual overcoming of the driving force can burn out the motor or inflict other damage.

Where prior motion-transmitting devices are used to convert rotary motion into translatory motion, still other problems are met. When, for example, the end of a translatory movement is reached, as by striking a stop, the output translatory element is often found to bind or otherwise become so impacted on the stop that it is not possible to retract the element back toward its starting point. As an instance, a threaded shaft may be rotated as by a motor to move a nut on the threaded shaft in a translatory or axial direction thereof. When the nut strikes a stop, particularly if the member rams against the stop in a sudden jarring impact, the nut may become skewed on the shaft or otherwise bound on the shaft or the stop. When it is subsequently attempted to reverse the motor and rotate the threaded shaft in the opposite direction and thereby retract the nut it is often found that the motor lacks sufficient power to withdraw the member.

To avoid some of the foregoing problems, it has been suggested to allow the translatory element to rotate freely upon striking a stop or "freewheel". For instance, in the above example, the nut can rotate freely or freewheel on the threaded shaft after striking a stop in the manner illustrated in U.S. Pat. No. 2,446,393 to Russell. However, in such construction there is freewheeling only when axial movement of the nut along the threaded shaft is absolutely blocked. That is, there is no control on the minimum amount of resistance to corotation of the driving and driven elements which is necessary to initiate freewheeling.

These drawbacks have motivated a search for a device that cannot only extend a load but support the load when extended.

SUMMARY OF THE INVENTION

The present invention has an actuator drive, a follower nut assembly, and a load carrying nut upon which a load is attached.

The termination load carrying device is attached to the trailing end of the load carrying nut. As the load carrying nut is propelled along the axis of a ball screw of the actuator drive, a follower nut in the follower nut assembly is maintained in close proximity to the load carrying nut by a cage attached about the follower nut and attached to the trailing end of the load carrying nut. When the load carrying nut runs off the threads of the ball screw, the inertia of the load attached to the load carrying nut causes the load to decelerate relative to the following nut, but now the follower nut still on the threads causes the load to be accelerated, but as the load reaches its extended position the follower nut shears a retaining pin and starts to freewheel in the cage. A thrust bearing is placed between the follower nut and the load carrying nut to minimize friction. The load is carried on the thrust bearing and because the follower nut is freewheeling the load is driven no further.

One object of the present invention is a termination load carrying device that acts as a support plateform for the load when fully extended by the load carrying device.

Another object of the present invention is a termination load carrying device having therein a follower nut and a load carrying nut.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
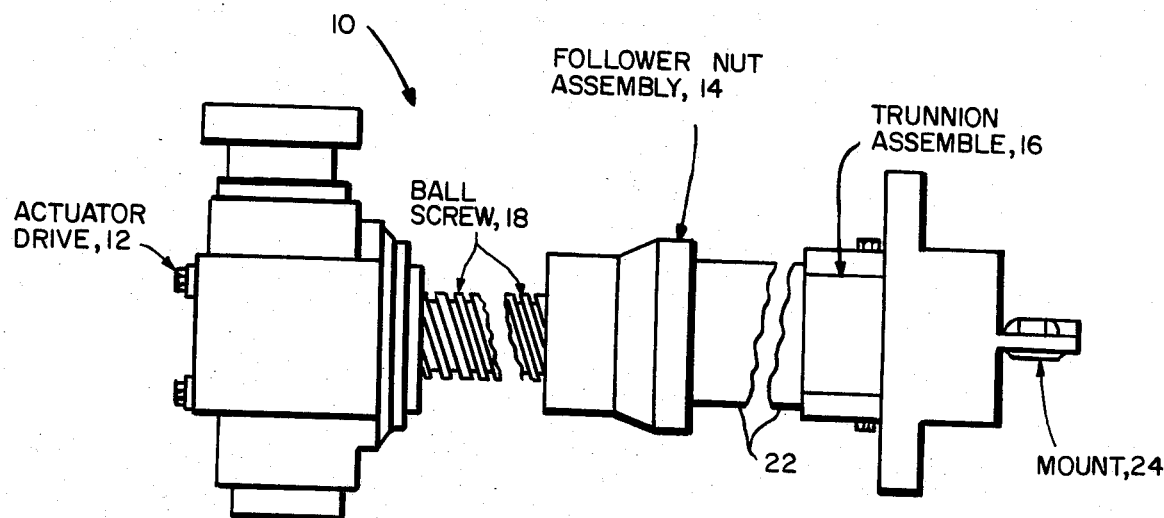
FIG. 1 illustrates schematically the actuator, a follower nut assembly and a load carrying nut assembly of the present invention.

Referring to FIG. 1, a termination load carrying device 10 is shown and is made up of an actuator drive 12, a follower nut assembly 14, and a load carrying nut 22.

Figure 2:
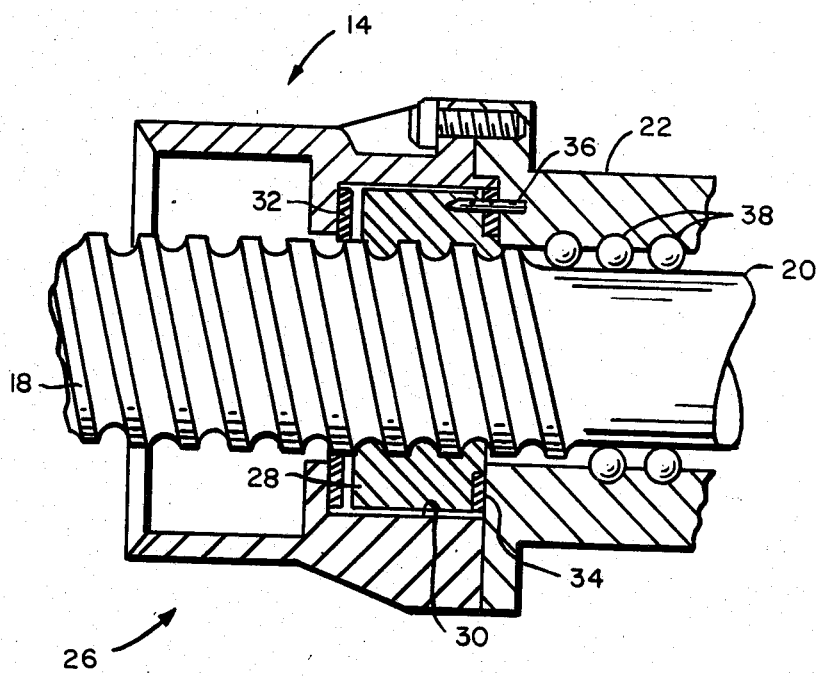
FIG. 2 illustrates in partial cross section of the follower nut assembly of the present invention.

Referring to FIG. 2, actuator drive 12 can rotate a ball screw 18 in either direction upon command. Ball screw 18 can be rotated up to about 10,000 revolutions per minute (rpm). Ball screw 18 is threaded over a substantial portion except for a run-off end 20 having no threads thereon. Ball screw 18 is inserted into and through follower nut assembly 14 and into a load carrying nut which is attached to a trunnion assembly 16 for attachment to the load. The details of this arrangement are shown in FIG. 2 and will be detailed hereinbelow. Trunnion assembly 16 has a mount 24 thereon for attachment to a load, not shown, but which can be an extendible exit cone. Actuator drive 12 is attached to a main housing, not shown, but which has a mass much greater than the load.

The mechanical operation between follower nut assembly 14 and load carrying nut 22 is detailed in FIG. 2. As shown, a housing 26 of follower nut assembly 14 is bolted to load carrying nut 22. A follower nut 28 is closely held within a cage 30 of housing 26. A spacer 32 and a thrust bearing 34 are placed about follower nut 28. Initially, a pin 36 prevents rotation of follower nut 28 within cage 30 as screw 18 rotates.

For example, ball screw 18 may have a diameter of 1.0 inches, a lead of 0.5 inches per revolution and, in this embodiment, rotates up to a maximum rpm of about 9500. Although a ball screw 18 is shown, any shaft-nut combination is possible, for example, such as an Acme thread.

Follower nut 28 has a radial clearance to cage 30 of about 0.025 inches, a clearance to spacer 32 of about 0.0415 inches, a clearance between thrust bearing 34 and load following nut 22 of about 0.021 inches and pin 36 has a diameter of about 0.066 inches.

As ball screw 18 rotates counter clockwise, follower nut assembly 14 translates to the right, at a certain point thereon, load carrying nut 22 will run-off the threads and onto run-off end 20 of ball screw 18. Before this point is reached the translating force of ball screw 18 was applied to balls 38 of load carring nut 22. After run-off of load carrying nut 22 and because of inertia, the load will start decelerating. At this point, the translating forces are applied fully to follower nut 28. Since follower nut 28 has a relatively high frictional engagement under load with ball screw 18 it tends to rotate with ball screw 18. Consequently, shear pin 36 will break off as soon as a predetermined force is applied. The load resists movement because of inertia and/or the manner of mounting; shear pin 36 breaks and follower nut 28 starts rotation with screw 18. Thrust bearing 34 provides the necessary support surface to load carrying nut 22 after shear pin 36 breaks. Follower nut 28 will still be forced against thrust bearing 34 during rotation but will not translate load carrying nut 22. Once the shear pin 36 breaks load carrying nut 22 cannot be re-loaded on ball screw 18.

Clearly, many modifications and variations of the present invention are possible in light of the above teachings and it is therefore understood, that within the inventive scope of the inventive concept, the invention may be practiced otherwise than specifically claimed.

What is claimed is:

1. A termination load carrying device, said device comprising:

a screw drive actuator, said actuator having a screw thereon with a run-off end having no threads thereon, a load being attached to said termination load carrying device, said load translating by said screw in the direction of said run-off end;

a load carrying nut assembly, said load carrying nut assembly being initially threaded onto said screw, said load being attached to a load supporting device of said load carrying assembly, said load carrying nut assembly having a tubular housing, said housing having a plurality of balls rotatably mounted on an inside cylindrical surface whereby threads of said screw operably engage said balls causing said housing to translate upon said screw as said screw rotates; and a follower nut assembly, said follower nut assembly fixedly attached onto said load carrying nut assembly, said follower nut assembly having therein a cage, said cage having said screw pass therethrough, said cage having mounted rotatably therein and on said screw a thrust bearing, a nut, and a spacer, said thrust bearing being in contact with said nut and said load carrying nut assembly, said spacer insuring minimum end play between said nut and said cage, said nut being releaseably held to said load carrying nut assembly by a shear pin, said shear pin breaking when said load carrying nut assembly is fully extended onto said run-off end of said screw, after said balls of said load carrying nut assembly are on said run-off end of said screw, the torque of said screw is fully applied to said nut whereby said shear pin breaks, said nut after said shear pin breaks rotating with said screw and against said thrust bearing to hold said load in said fully extended position.

* * * * *